Feb. 15, 1966  H. SONTHEIMER ETAL  3,235,083
APPARATUS AND PROCESS FOR REMOVING SLUDGE
FROM LONGITUDINAL BASINS
Filed May 2, 1963  3 Sheets-Sheet 2

Feb. 15, 1966 H. SONTHEIMER ETAL 3,235,083
APPARATUS AND PROCESS FOR REMOVING SLUDGE
FROM LONGITUDINAL BASINS
Filed May 2, 1963 3 Sheets-Sheet 3

United States Patent Office 3,235,083
Patented Feb. 15, 1966

3,235,083
APPARATUS AND PROCESS FOR REMOVING
SLUDGE FROM LONGITUDINAL BASINS
Heinrich Sontheimer, Auf dem Seif 9, Falkenstein,
Taunus, Germany, and Christian Schmid, Obermainan-
lage 21, Frankfurt am Main, Germany
Filed May 2, 1963, Ser. No. 277,648
Claims priority, application Germany, May 10, 1962,
M 52,805
10 Claims. (Cl. 210—83)

This invention relates to apparatus and process for the continuous removal of sedimented material from longitudinal sedimentation basins.

It is an object of this invention to provide an improved and economical method and apparatus for removing sludge deposited on the bottom of a longitudinal basin.

Another object is to provide an apparatus of the type referred to which is simple in construction and operation.

Another object is to provide sludge removal means for a sedimentation basin which minimizes the distance through which the sludge must be conveyed.

Another object is to provide sludge removal means which remove the sludge from a sedimentation basin at the places where it deposits.

Another object is to provide a method of removing sludge from a basin wherein the frequency of sludge removal from individual portions of the basin corresponds to the quantity of sludge settling in the respective basin portions.

Another object is to provide a process of removing sludge from a basin in progressive phases.

Another object is to provide a sludge removal device which permits to effect classification of heavier and lighter solids.

Another object is to provide an oscillating sediment scraper whose blades are in sediment conveying position during both the forward and backward movement of the scraper along the longitudinal axis of the basin.

Another object is to provide for a settling basin a sludge channel extending for the full length of the basin and an oscillating scraper whose blades always automatically assume a position wherein they form a predetermined acute angle with the portion of the sludge channel in front of the scraper in the direction of its travel.

Another object is to provide sludge removal means which are so constructed as to prevent undue accumulation of scraped sludge in any part of the basin.

Other objects will become apparent upon consideration of the specification and the claims which follow.

As is well known, settleable materials are separated from waters by reducing the flow velocity of the water in suitable basins, so that the solids can deposit on the basin bottom. By means of scraping devices these settled materials are usually moved to a sludge sump at the inlet side of the basin. This usual manner of operation has a number of disadvantages, particularly with larger size basins. The paths over which the scraper must convey the sludge become very long; consequently very light sludges become resuspended, whereby a portion of the solids may return to the clarified water. Furthermore, it is difficult to construct suitable scraper devices which can convey large quantities of sludge over long distances. This is particularly true of activated sludge plants where frequently a return proportion of 100% or more of the throughput must be maintained.

Numerous attempts have been made to overcome these drawbacks. For example, chain scrapers are used for moving larger sludge quantities along the basin bottom to the sump at the inlet. It is also known to arrange the sump in or near the center of the basin and to convey the sludge thereto from both sides in order to shorten the conveying path.

These manners of operation have the disadvantage that they do not take the nonuniform accrual of sludge on the basin bottom sufficiently into account. The accrual of sludge is always greater in the vicinity of the inlet than in the vicinity of the outlet from the basin. With the known mechanical sludge removal devices about half of the distance covered is run without load.

In the process according to the invention, a movable scraping device is used to which a pump is fixed which delivers to a channel outside the basin. The scraping device does not sweep over the entire basin in one scraping cycle, but is so controlled that the sections where sludge settles in larger quantity, are scraped more frequently than sections where lesser quantities deposit. In a longitudinal basin this is done in very simple manner by moving the scraping device from the inlet side first only over, for example, one third of the basin length and returning it to the inlet side. In a second phase the scraping device moves over two thirds of the basin length, so that the sludge from these two thirds is removed. Only in a third phase is the entire basin scraped, i.e. the scraper moves to the end of the basin. Scraping takes place during the forward and return movements.

In the example described the first portion of the basin is scraped six times during each cycle, whereas the second portion is scraped four times and the last portion only twice. Since considerably more sludge deposits in the first portion, this simple method of operation results in a withdrawal of the sludge in quantity corresponding to its accrual in the individual basin portions.

To carry out the process according to the invention, the usual sludge sump in the vicinity of the inlet is replaced by one or a plurality of sludge channels which extend in the basin bottom in the direction and for the full length of the movement of the scraper. The scraper is moved in known manner with the scraper bridge, which runs along the edge of the basin.

In accordance with the invention the scraper blades are connected to the bridge at one end by means of vertical guides which are rigidly affixed to the bridge and about which the blades can pivot, and at the other end by adjustable means, such as a rope or stop brackets. All such means will be referred to hereinafter as "stop means." Due to these connections, the scraper blades, upon movement of the bridge, assume an angular position to the sludge channel which can be regulated by the length of the rope or the position of the stop brackets, the angle between the scraper blade and the portion of the channel in front of it in the direction of movement being smaller than 90°.

A sludge pump mounted on the bridge pumps the sludge collected in the sludge channel through a conduit extending into the sludge channel and conveys it to a sedimentation tank or a collecting channel arranged outside the basin.

The invention will be more readily understood by reference to the drawings wherein like reference characters designate similar elements.

In all figures conventional basin components, such as the liquid outlet, and drive means, such as motors, switches and electrical circuits, have been omitted for clarity, since these elements form no part of this invention.

Figure 1:
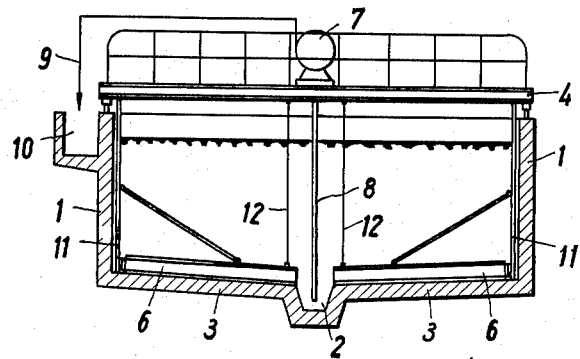
FIGURE 1 is a diagrammatic vertical cross-sectional view of a basin equipped with sludge withdrawal means according to the invention taken on line 1—1 of FIGURE 2.
Figure 2:
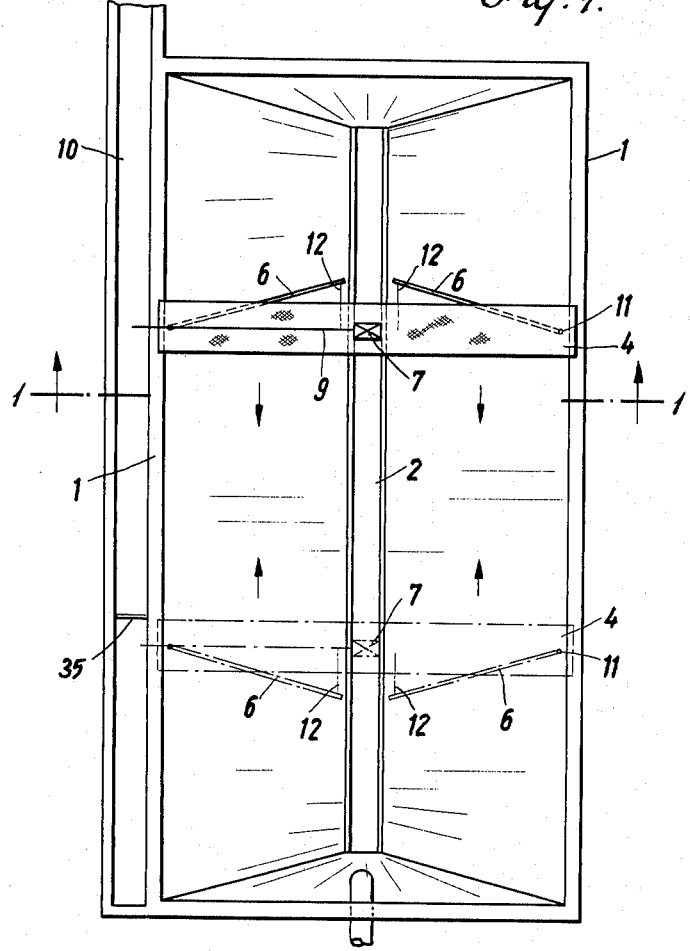
FIGURE 2 is a plan view of the basin of FIGURE 1 showing diagrammatically the sludge scrapers in their positions during forward and backward travel.

In FIGURES 1 and 2, the numeral 1 denotes the side walls of a longitudinal basin having an inlet 32. 2 is a sludge collecting channel, 3 the bottom of the basin, which preferably is inclined toward the channel 2. 4 denotes a scraper bridge, which is supported in the usual manner on rollers running on rails along the top of the walls 1, and is driven by a suitable reversible motor, not shown. 6 are the scraper blades. On the bridge 4 a pump 7 is mounted which sucks sluge from channel 2 through a conduit 8 and discharges it through a conduit 9 to a collecting channel 10 arranged outside the basin, or to a settling tank or place of disposal.

The scraper blades 6 are suspended from the bridge 4 and scrape, respectively, the portions of the basin bottom right and left of the channel 2. The blades may be connected to the bridge in different manners. As shown in FIGURES 1 and 2, each blade is pivotally connected with its outer end to a guide member, for example a rod 11, which is rigidly affixed to the bridge 4, and with its inner end to an adjustable rope or cable 12, which is fastened to the bridge with its other end. With this construction the inner end of the blade at the edge of the collecting channel can oscillate in horizontal direction, the amplitude of the oscillations being limited by the length of the rope or cable 12. As soon as the scraper bridge moves, the scraper blades are also moved, the inner end trailing more or less far behind, depending on the length of the rope or cable 12. When the bridge starts its return travel, the scraper blade revolves about the rigidly guided end and the inner end follows the scraping movement only when the rope is taut, whereby the blade assumes again the original angle toward the sludge channel. In this manner the sludge is conveyed continuously by an oscillating scraper into the collecting channel 2 and pumped therefrom to disposal. To avoid dead space that cannot be scraped fills may be provided at each end wall of the basin, which, as shown, conform to the angular positions of the blades 6 at the end of their travel toward the respective end wall.

In operation the scraper is moved in a first scraping phase only over the section of the basin near its inlet end, where the greatest quantity of sludge settles, and is then returned to the inlet end. This section may be, for example, one third of the basin length. Thereafter, the scraper may be moved in a second scraping phase over two thirds of the basin and back to the inlet end, so that two thirds of the bottom are cleaned. In a final phase the scraper travels the full length of the basin and back to the inlet end. On each trip the scraper blades push sludge into the corresponding portion of the sludge sump during both their forward and return travel. Thus, by scraping in changing rhythm a more or less large portion of the basin bottom or the entire bottom, the scraping of the basin bottom is largely proportioned to the distribution of the sludge. This scraping of each portion of the basin bottom as often as required to correspond to the sludge accrual at the respective portion can be accomplished by conventional means, such as timers or reversing switches controlling the drive motor.

It is also possible to control the operating phases from the concentration of the sludge on the basin bottom, by continuously or intermittently checking the concentration of the sludge and moving the scraper forward until the concentration is below a predetermined minimum value. Then the return movement of the scraper begins, which again is followed automatically by a further forward movement, whose length is controlled by the sludge concentration on the basin bottom.

Figure 3:
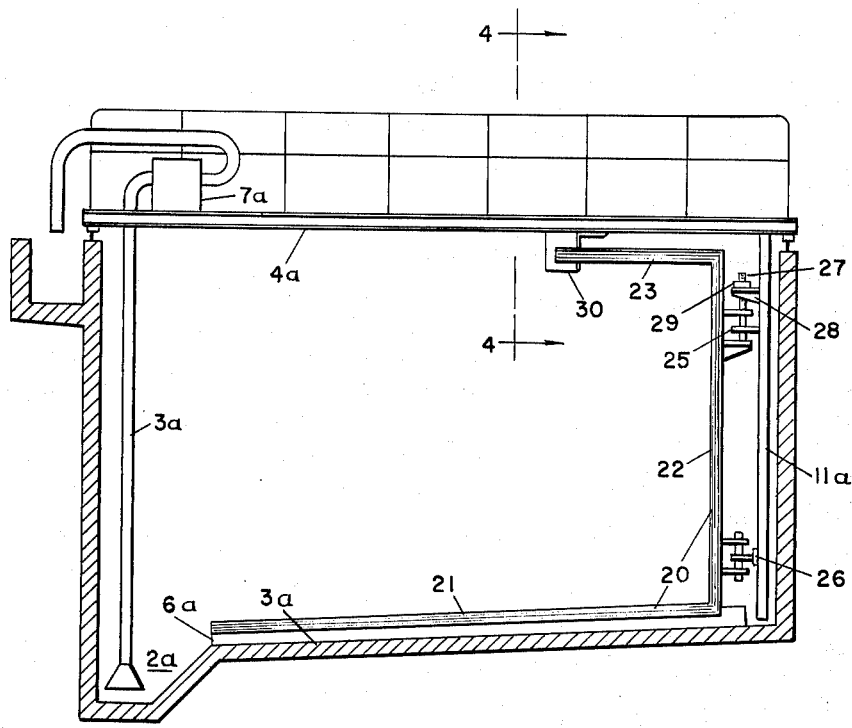
FIGURE 3 is a vertical cross-sectional view of a basin equipped with modified sludge withdrawal means.

In the embodiment of the invention shown in FIGURE 3, the sludge channel 2a, from which pump 7a withdraws sludge, is arranged along one of the side walls of the basin. With this construction, which is suitable particularly for basins of relatively small width, only one scraper blade is used, as shown. While the blade 6a may be connected to the bridge 4a in the same manner as the blades 6 in FIGURES 1 and 2 to bridge 4, a modified form of connection is shown in FIGURES 3 and 4.

The scraper blade 6a of this embodiment is affixed to a member 20, preferably in form of a tube, which has a leg 21 extending horizontally from the sludge channel 2a across the basin sufficiently near the bottom 3a that the blade 6a can scrape the bottom. The member 20 has also a vertical leg 22 parallel to the side wall opposite the sludge channel, and an upper horizontal leg 23 subjacent the bridge 4a. The vertical leg 22 is pivotally connected to the rod 11a by pivot connections 25 and 26. The exact height of the member 20 and blade 6a can be adjusted by means of a shaft 27 extending through the pivot connection 25 and through a bracket 28, affixed to the rod 11a. By turning a nut 29, the shaft 27 can be raised or lowered, thereby raising and lowering the member 20 and the blade 6a. As shown in FIGURE 3, the blade 6a may be extended beyond the member 20, so that the space of the bottom between member 20 and rod 11a can be scraped.

Stop means are provided to limit the oscillating movement of the blade 6a and member 20 to the desired angle. These may take the form of stop brackets 30 affixed to the underside of the bridge 4a, between which the end of the upper horizontal leg 23 can reciprocate. Alternatively, a rope or cable 31 may connect leg 23 of member 20 with the bridge 4a and regulate the amplitude of reciprocation by its length; or, as shown in FIGURE 4 in full lines, a rope or cable 31 may limit the angular movement during travel in one direction, and, as shown in dotted lines, a stop 30 may limit the angular movement during travel in the opposite direction.

Figure 4:
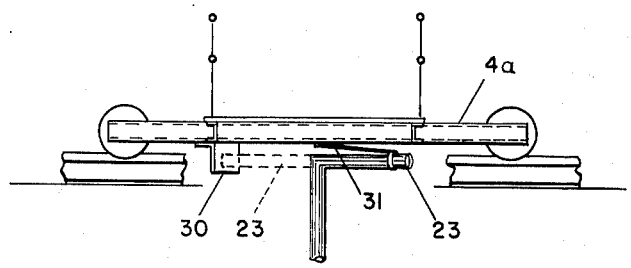
FIGURE 4 is a sectional view along line 4—4 of FIGURE 3.

The modified connections between the bridge and blades 6a, shown in FIGURES 3 and 4, can be used as well with the blades 6 of FIGURES 1 and 2.

Figure 5:
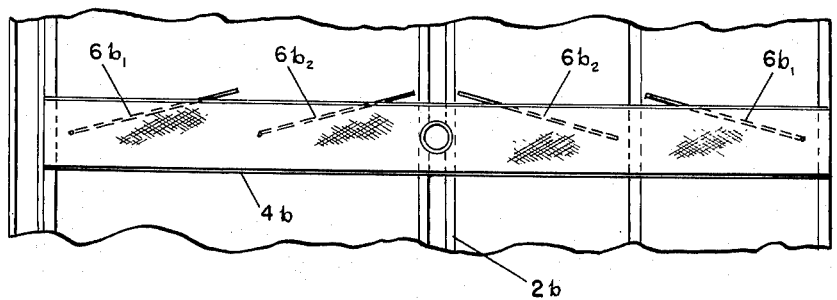
FIGURE 5 is a diagrammatical partial plan view of a wide basin fitted with multiple scrapers for stepwise conveying of sludge to a central sludge channel.

FIGURE 5 shows the invention applied to a basin of relatively great width, where it is impractical to use only two scraper blades, such as shown in FIGURES 1 and 2, for scraping the entire width of the basin. In this embodiment the sludge is conveyed stepwise from the outer area of the basin to the sludge channel. Two scraper blades $6b_1$ are used to scrape sludge deposited in the outer areas of the basin on opposite sides of the sludge channel 2b inwardly toward the area where two further scraper blades $6b_2$ operate to scrape the sludge by blades $6b_1$ and that settled in the inner area toward and into the central sludge channel 2b.

The four blades operate independently of one another and are connected individually to, and supported from, a common bridge 4b in the manner described in connection with FIGURES 1 and 2 or FIGURES 3 and 4. The angular position of blades $6b_1$ may differ from that of blades $6b_2$, if desired, but both sets of blades will be limited to acute angles with respect to the sludge channel in front of them in the direction of travel.

In basins of such great width that the arrangement of FIGURE 5 does not result in satisfactory sludge removal, several parallel sludge channels can be arranged, with a corresponding number of sets of scraper blades affixed to a common scraper bridge, each set of blades being arranged relative to its associated sludge channel and operating in the same manner as blades 6 of FIGURE 1.

One advantage of the apparatus and process lies in the fact that the sludge must be moved only a short distance transverse to the direction of flow over the basin bottom from the periphery to the sludge channel, and not, as previously, countercurrent to the flow direction over the entire basin to the sludge sump. The sludge is not accumulated in a sludge sump but immediately pumped from the channel. This method is particularly important with activated sludge where the biological activity is maintained by quick return, and with heavy sludges which become so compact after a short time that they cannot be moved by known longitudinal scrapers.

A further advantage lies in the fact that scraping takes place both during forward and return travel of the scraper, whereas with the usual constructions of longitudinal scrapers, about 50% of the operating time is required for movement without load, or duplicate scraper blades are used which are alternately in active and inactive position to obtain scraping in both directions. Such devices are quite complicated as contrasted with the simple construction by which the scraper according to the invention attains this result.

With this apparatus and process it is superfluous to construct a sludge sump. In this manner considerable cost due to ground water conditions and difficult excavation can be saved. Finally, the process of the invention permits to choose the length of the sedimentation basin without regard to the scraping distance.

Instead of using scraper blades, the sludge can be uniformly sucked up by the pump by means of known suction pipes from the entire sections of the basin bottom over which the bridge moves.

The process according to the invention permits also a certain classification of the solids. The readily settleable solids will deposit in the first portion of the basin and can be separately removed during scraping of the first portion and conveyed to a different kind of use than the slower sedimenting sludge particles. For example, if in an activated sludge process heavy, mainly inorganic solids are present, it is advantageous to withdraw these heavy solids as excess sludge to avoid excessive concentration of these solids in the return sludge. Such a sludge classification can be carried out in various manners. For example, as indicated in FIGURE 1, the collecting channel 10 may be divided by a partition 35 into two portions of the proper length, of which one receives the heavy sludge containing inorganic matter which deposits near the inlet of the basin, and the other the lighter, predominantly organic sludge accruing in the other parts of the basin. Obviously, the two channel portions must be provided with separate outlets, not shown, which will be connected, respectively, to a point of treatment or disposal of excess sludge and to the aeration basin of the activated sludge plant. The partition 35 may be movable so that the proportion of excess sludge to return sludge can be regulated as required.

Another manner of carrying out the sludge classification is by pumping the heavy sludge fraction up to a certain basin length by a separate pump, not shown, into a separate sludge channel, not shown, and thence conveying it to a point of sludge treatment or disposal, and by pumping sludge accruing in the farther portion of the basin by means of pump 7 into the channel 10 and thence return it to the aeration basin. In this case the proportion of excess sludge to return sludge can be regulated by varying the time of switch over from one pump to the other, or by varying the pump output.

Figure 6:
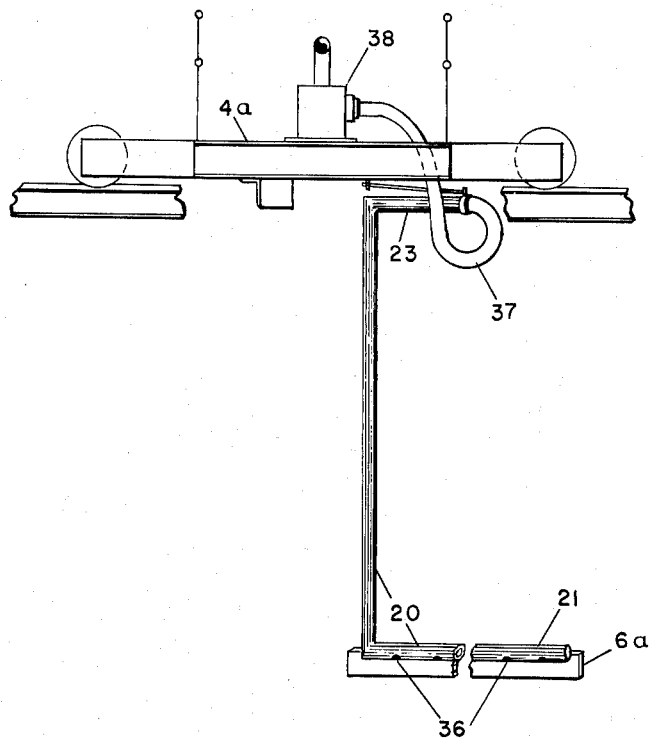
FIGURE 6 is a partial side elevation of the scraper assembly in scraping position, with elements for sludge classification added.

In still another manner of carrying out sludge classification, the horizontal leg 21 of member 20 of FIGURE 3 is used as a suction pipe by providing spaced inlet ports of suitable size, such as ports 36 of FIGURE 6, along its length and flexibly connecting the end of upper horizontal leg 23, as by a hose 37, to a pump 38 on the bridge 4a. In operation, the blade 6a scrapes the heavy bottom sludge into the sludge channel 2a, whence it is withdrawn by pump 7a, while the lighter material above the bottom sludge enters member 20 through the ports 36 and is withdrawn separately from the heavy sludge by pump 38. While this sludge classification has been described and shown for purposes of illustration in connection with FIGURE 3, wherein the basin has its sludge channel along a side wall and only one blade is used, obviously the classification is not limited to such a basin, but can be carried out in the same manner in a basin with a central sludge channel and a pair of blades arranged on opposite sides thereof.

The possibility of classification of the sludge, which has many uses, is also based on the special characteristic of the process according to the invention that the sludge is always removed from the sedimentation basin at the places where it settles, so that it moves only through a short removal path to the collecting channel.

We claim:

1. In a longitudinal basin, means for removing sludge from the bottom of said basin comprising, a sludge channel extending centrally for the full length of the basin, a bridge supported by the side walls of said basin and reciprocable from end wall to end wall of said basin, two pairs of scraper blades in said basin, one pair having its inner ends adjacent said sludge channel on opposite sides thereof and extending outwardly therefrom across the central portion of said basin, the other pair having its outer ends adjacent the side walls of said basin and extending inwardly therefrom to said central portion, means connecting each of said blades separately and independently of the others to said bridge, said means comprising a guide rod for each of said blades, each rod being rigidly connected to said bridge and pivotally connected to one of said blades so that said blades, upon movement of said bridge, also move, with their inner ends trailing, and upon reversal of the direction of movement of said bridge, pivot about said guide rods, stop means connected to said bridge and limiting the trailing of said inner ends so that said blades form acute angles of predetermined width with the sludge channel in front of them in the direction of movement, and means supported by and traveling with said bridge for withdrawing sludge from said sludge channel.

2. In a sedimentation basin having a bottom, means for removing sludge from said bottom including, a sludge channel in said bottom and extending for the length of said basin, a bridge reciprocable from end to end of said basin, a scraper blade movable with said bridge in proximity to said bottom, and a pump supported by and traveling with said bridge and having a suction inlet extending into said sludge channel and a discharge outlet to outside said basin, improved means connecting said blade to said bridge, said connecting means comprising a guide rod rigidly affixed to said bridge and extending downward therefrom, a member having a lower horizontal leg near the bottom of said basin, a vertical leg extending upwardly from said lower horizontal leg to an elevation subjacent said bridge, and an upper horizontal leg extending underneath said bridge, said blade being affixed to said lower horizontal leg, at least one pivotal connection between said guide rod and said vertical leg, and stop means affixed to said bridge and limiting pivotal movement of said second horizontal leg to an angle of predetermined width.

3. The sludge removing means of claim 2, including means for removing sludge from above the bottom sludge which is scraped by said blade, said means comprising spaced ports in said lower horizontal leg, a second pump supported by and traveling with said bridge, and a flexible connection between the end of said upper horizontal leg and said pump.

4. A method of operating reciprocable sludge removal means in a sedimentation basin including a scraping device, a sludge receiving channel extending the length of the basin, and a pump withdrawing the sludge scraped by said scraping device into said channel to regulate the removal of sludge from the sedimentation basin in accordance with the quantity and quality of sludge settling in individual portions of said basin, comprising continuously removing sludge transversely to said sludge channel by reciprocating the sludge removal means during each removal cycle from the basin inlet end first only over the portion adjacent said basin inlet end, where the greatest quantity of readily settleable solids settles, thereafter reciprocating said sludge removal means from said inlet end beyond said adjacent portion over further portions of the basin to a point short of the outlet end where lesser quantities of solids deposit, and finally, reciprocating said sludge removal means from the inlet end to the outlet end of said basin and back to the inlet end.

5. In an apparatus for the removal of sedimented solids from the bottom of a settling basin having a bottom and upstanding walls, a bridge reciprocable on the walls of said basin, a sludge channel in said bottom parallel to and coextensive with the direction of reciprocable movement of said bridge, pump means mounted on said bridge and having a suction inlet extending into said sludge channel and an outlet discharging to a point outside said basin, a scraper blade adjacent said sludge channel in proximity to said bottom, said scraper blade extending from said wall to said sludge channel and connected to and reciprocable with said bridge, means connecting said blade to said bridge comprising, guide means rigidly connected to said bridge and extending downwardly therefrom adjacent said wall, said blade having a free end adjacent said sludge channel and having means to pivotally connect its other end to said guide means so that the end of said blade adjacent said sludge channel is free to rotate upon reversal of said bridge and assume a position with the sludge channel determined by the direction of movement of said bridge, and stop means limiting the extent of said rotational movement of said blade so that said blade forms a predetermined acute angle with the portion of the sludge channel in front of said blade in the direction of travel of said bridge.

6. The apparatus of claim 5 wherein said stop means limiting the extent of said pivotal movement of said blade comprises a rope connecting said bridge and the end of said blade adjacent said sludge channel, the length of said rope limiting the rotational movement of said blade to form said predetermined acute angle.

7. In a settling basin having a bottom, side walls, and end walls, a sludge channel in the bottom of said basin extending the length of said basin, a horizontal bridge reciprocable on said side walls, pump means mounted on said bridge and having a suction inlet extending into said sludge channel and an outlet discharging to a point outside said basin, a pair of scraper blades, one on each side of said sludge channel adjacent said bottom, each scraper blade extending from said basin wall to said sludge channel and connected to and reciprocable with said bridge, means connecting said blades to said bridge comprising, a pair of rods rigidly connected to said bridge and extending downwardly therefrom on opposite sides of said sludge channel, each blade having a free end adjacent said sludge channel and having means to pivotally connect its other end to one of said rods, whereby upon movement of said bridge the blade also moves with its free end trailing, means limiting the trailing of said free end so that said blade assumes a position at an acute angle to the sludge channel in front of it in the direction of movement, said blades, upon reversal of the direction of travel of said bridge, pivoting about said rods and assuming again a position at an acute angle to the sludge channel in front of it in the direction of reverse travel.

8. The apparatus of claim 7, including a fill at each end wall corresponding to the acute angular positions of said blades at the end of their travel toward the respective end wall.

9. The apparatus of claim 7, including a collecting channel outside the basin along one of said side walls, said pump discharging to said collecting channel.

10. The apparatus of claim 9, including a partition across said collecting channel separating the portion of said channel receiving the sludge from near the inlet of said basin from the portion receiving the sludge from the balance of the basin.

References Cited by the Examiner
UNITED STATES PATENTS

| | | | |
|---|---|---|---|
| 1,879,135 | 9/1932 | Downes et al. | 210—527 |
| 1,916,460 | 7/1933 | Bousman | 210—527 |
| 2,009,559 | 7/1935 | Mieder | 210—523 X |
| 2,096,409 | 10/1937 | Sayers | 210—526 |
| 2,150,865 | 3/1939 | Shafer et al. | 210—528 |
| 2,670,080 | 2/1954 | Scott | 210—527 |
| 2,708,520 | 5/1955 | Dallas | 210—525 |
| 2,775,556 | 12/1956 | Kelly et al. | 210—528 |
| 2,779,471 | 1/1957 | Knapp | 210—523 |
| 2,881,923 | 4/1959 | Nelson | 210—525 |
| 3,081,879 | 3/1963 | Schroeder et al. | 210—523 |

FOREIGN PATENTS

| | | |
|---|---|---|
| 757,476 | 9/1956 | Great Britain. |

REUBEN FRIEDMAN, *Primary Examiner.*